US008566743B2

(12) United States Patent  (10) Patent No.: US 8,566,743 B2
Feinberg et al.  (45) Date of Patent: Oct. 22, 2013

(54) COMPUTER METHOD AND SYSTEM FOR TOPOGRAPHICAL REPRESENTATION OF TEXTUAL DATA

(75) Inventors: Jonathan Feinberg, Medford, MA (US); Irina Ros, Chelmsford, MA (US); Martin M. Wattenberg, Winchester, MA (US); Fernanda B. Viegas, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/949,136

(22) Filed: Nov. 18, 2010
(Under 37 CFR 1.47)

(65) Prior Publication Data

US 2012/0131499 A1  May 24, 2012

(51) Int. Cl.
*G06F 3/048* (2013.01)
(52) U.S. Cl.
USPC .......................................... 715/800; 715/781
(58) Field of Classification Search
USPC .......................................... 715/249, 781, 800
See application file for complete search history.

(56) References Cited

U.S. PATENT DOCUMENTS

| 5,893,125 | A | * | 4/1999 | Shostak .......................... 715/206 |
| 6,144,962 | A | | 11/2000 | Weinberg et al. |
| 6,928,536 | B2 | | 8/2005 | Baudel |
| 7,260,789 | B2 | | 8/2007 | Hunleth et al. |
| 7,502,780 | B2 | | 3/2009 | Thorpe |
| 7,603,329 | B2 | | 10/2009 | Wocke et al. |
| 7,668,726 | B2 | | 2/2010 | Cardno et al. |
| 2006/0104511 | A1 | * | 5/2006 | Guo et al. ....................... 382/176 |
| 2008/0162474 | A1 | * | 7/2008 | Thong et al. ....................... 707/6 |
| 2008/0235585 | A1 | * | 9/2008 | Hart et al. ....................... 715/717 |
| 2009/0063557 | A1 | | 3/2009 | MacPherson |
| 2009/0204582 | A1 | | 8/2009 | Grandhi et al. |
| 2009/0313574 | A1 | * | 12/2009 | Shih et al. ....................... 715/781 |
| 2010/0241944 | A1 | * | 9/2010 | Athsani et al. ................ 715/230 |
| 2011/0004828 | A1 | * | 1/2011 | Callicrate et al. ............. 715/738 |
| 2011/0035660 | A1 | * | 2/2011 | Lussier et al. ................. 715/239 |

OTHER PUBLICATIONS

Small, D., "Rethinking the Book", Massachusetts Institute of Technology, 11 pages, Jan. 1999.
Wei, L., "Applying Graph Layout Techniques to Weber Information Visualization and Navigation", International ACM/SIGIR Conference of Research and Development in Information Retrieval, vol. 14, pp. 262-269, Oct. 31, 1991.
Lin, X., et al., "A Self-Organizing Map for Information Retrieval", 14th ACM SIGIR on Research and Development in Information Retrieval, pp. 262-269, 1991.
Brown University, "Graph Drawing and Information Visualization", Conduit!, vol. 8, No. 1, Spring 1999.

* cited by examiner

*Primary Examiner* — Omar Abdul-Ali
(74) *Attorney, Agent, or Firm* — Hamilton, Smith, Brook & Reynolds, P.C.

(57) ABSTRACT

Computer system, method and apparatus generate and display a graphical representation of a body of text. The graphical representation serves as a text map allowing navigation operations and other user interaction. The text map enables improved navigation of the body of text. Computer-based geographic mapping operations (e.g., zoom, pan, highlight, etc.) are used to navigate the text. The text map may have various graphical feature overlays also navigable by and interactive to the user.

22 Claims, 8 Drawing Sheets

47

| Lorem iplum dolor ait amet consect etuar adipiscing clit. Etiam venen astias velit quis lacus condimentum at flucibus purus vehicula. | Tetiam venen astias velit quis lacus condimentum a flucibus purus vehicula. Etiam venen astias velit quis lacus condimentum at flucibus purus tortor facucitbus eros etiam venen astias velit quis lacus condimentum a | Lorem iplum dolor ait amet consect etuar adipiscing clit. Etiam venen astias velit quis lacus condimentum at flucibus purus vehicula. Petiam venen astias velit quis lacus condimentum a flucibus purus vehicula. Etiam venen astias velit quis lacus condimentum at | Lorem iplum dolor ait amet consect etuar adipiscing clit. Etiam venen astias velit quis lacus condimentum at flucibus purus veros etiam venen astias velit quis lacus condimentum at flucibus purus tortor facucitbus eros etiam venen astias velit quis lacus condimentum a flucibus purus tortor facucitbus eros |

41 —

VIEWPORT condimentum at flucibus purus

Ltortor facucitbus eros etiam venen astias velit quis lacus condimentum at flucibus purus tortor facucitbus eros etiam venen astias velit quis lacus condimentum a flucibus purus tortor facucitbus eros etiam venen astias velit quis lacus condimentum a flucibus purus tortor facucitbus eros etiam venen astias velit quis lacus condimentum a flucibus purus flucibus purus ortor facucitbus eros etiam venen astias velit quis lacus condimentum a flucibus purus vehicula. Etiam venen astias velit quis lacus condimentumortor facucitbus eros etiam venen astias velit quis lacus condimentum a flucibus purus vehicula. Etiam venen astias velit quis lacus condimentum.

ENTIRE MAP

COMPUTER METHOD AND SYSTEM FOR TOPOGRAPHICAL REPRESENTATION OF TEXTUAL DATA

BACKGROUND

As quantities of digitized information grow rapidly, the prevalence of data in a textual format becomes evident. From ever growing numbers of blog posts, to governments advancing from paper archives to using the internet to its full potential, the quantity of raw text available is increasing steadily. Traditionally, large bodies of text have been organized and classified in ways that allowed for easier traversal of the text. From books to websites, large collections have taken a form on line that replicates the physical manifestations they have previously embodied on paper. As the amount of data grows, however, it is becoming increasingly important to provide tools that allow for faster and higher level understanding and navigation of the underlying text, independent of its basic logical structure.

Google Maps is a geographic map service that one views in a web browser. Depending on one's location, one can view basic or custom geographic-type maps and local business information, including business locations, contact information, and driving directions. One can select and move (e.g., click and drag) maps to view adjacent sections immediately. One can view satellite images of a desired location and can zoom (increase/decrease granularity or scale of) and pan the images. Thus Google Maps is an example mapping framework that introduces computer user interaction concepts. However, Google Maps does not address text documents or bodies of text.

The Seesoft® software visualization system enables one to analyze up to fifty thousand lines of code simultaneously by mapping each line of code into a thin row. The color of each row indicates a statistic of interest, e.g., red rows are those most recently changed, and blue rows are those least recently changed. The system allows for visually examining lines of textual data in a larger context. The system does not however, allow for user interactions that are similar to those available in the context of a geographical map such as panning and zooming. The level of detail in the Seesoft system is limited to a line by line level of details.

Google Books is a web based book browsing service. Scanned previews and entire books are offered to the public along with relevant information about the book such as links to purchase the book. The Google Books system provides an electronic way of reading and searching large bodies of text. However, Google Books does not provide a geographic map-like interface to large collections of text along with highlighting of various features in the text.

BRIEF SUMMARY

Applicants propose a new method of representation for a body of text that makes use of many computer-based geographic mapping principals. Using similar navigation principals and interactions as in computerized geographic maps, a single or multiple bodies of textual data can be traversed in a manner separate from the logical sequence of the text.

According to embodiments of the present invention, provided are a computer method, system and apparatus for navigating and/or viewing textual data (e.g., text documents) using equivalent computer-based geographical map navigation operations and user interface. In one embodiment, the computer method/apparatus comprises: a layout engine converting a body of text to a graphical representation, and a map client rendering the graphical representation in a user-interactive interface. The rendered graphical representation serves as a text map, and the user-interactive interface has navigation operations that enable at least panning of the text map and zooming of the text map. The user-interactive interface has other operations as well.

The body of text is any of a document, book, article and other work of text, i.e., textual data as provided on computer means.

In one embodiment, the converting by the layout engine includes mapping characters from the given body of text to respective graphical locations in the graphical representation. Further the converting by the layout engine includes determining a layout of text in the graphical representation.

In accordance with another aspect of the invention, the method/apparatus further comprises segmenting the graphical representation into one or more sets of tiles. There is a respective different set of tiles for different zoom levels.

In accordance with another aspect of the invention, the method/apparatus further comprises:
identifying features in the given body of text; and
storing the identified features in a manner enabling rendering representation of the identified features with the graphical representation. The identified features may be predefined features in the body of text.

Embodiments include overlaying on the text map, graphical feature representations, markers and the like. The markers may be any of:
a geometric shape identifying an area in the text map,
an indicator identifying a single point in the text map, and
hyperlinks or similar links One embodiment is a computer program product carrying out the foregoing.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4 is a schematic illustration of a text document map (or TextMap, generally) generated by the embodiment of FIG. 1.

DETAILED DESCRIPTION

Figure 1:
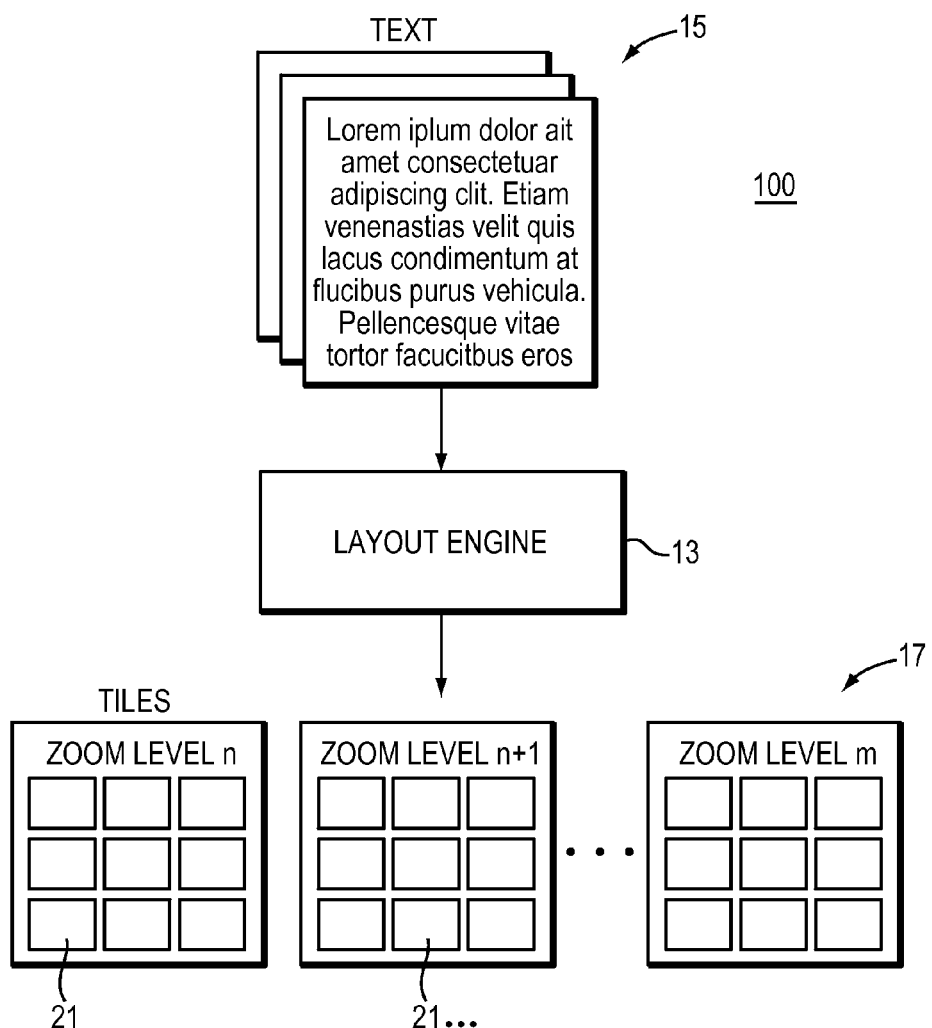
FIG. 1 is a block diagram of one embodiment of the present invention.

With reference now to FIG. 1, one embodiment of the present invention is shown and referred to herein as the "Text- Maps" system 100. TextMaps is an innovative mapping system, making use of traditional geographic mapping concepts to represent, navigate and understand data and in particular text data.

Concepts

The following concepts will be used throughout the following description of the system 100:

1. Map—A physical, usually but not limited to a two-dimensional representation of a plane, surface, and in our case, text. The terms "text document map" and "text map" are used interchangeably with "map" for the subject case.

2. Viewport—The region of a map that is visible; graphics outside this region will not appear even if drawn.

3. Panning—The act of re-centering the map in relation to a viewport that is represented by the user's browser window. The map object, which is often larger than can fit into a single screen, can thus be seen as its various parts are brought towards the viewport. The act of panning can be accomplished by but is not limited to dragging with a mouse, using keyboard shortcuts etc.

4. Zooming—The act of viewing a portion of a map at a larger or smaller scale than a current state.

5. Feature—Atomic pieces of information that together comprise a map. Features in the TextMap system 100 may include but are not limited to words, punctuation, numbers, images, sentences, paragraphs, columns, expressions that match a particular pattern of interest and any combination thereof.

6. Layer—A collection of features that are logically grouped together. A map consists of one or more layers. This supports layering visual representations on top of the original text of a single document (body of text) in the form of overlays in embodiments of the invention.

7. Tile—For performance reasons, often a map layer can be represented as a collection of tiles that when put together in accordance with their coordinates in the layer space, comprise the entire layer.

Overview of the System 100

Layout Engine 13

At the core of the invention TextMaps system 100 is a Text Layout Engine 13 that is responsible for converting input text 15 (such as a text document or other body of text) into a graphical representation 17 of the text. In one embodiment, text layout engine 13 builds graphical indices that map characters from input text 15 space to their graphical location in graphical representation 17 space. Text layout engine 13 also defines a layout of the text in the graphical representation 17. This may be by determining or otherwise identifying the predefined layout of the input text 15 and converting that to a layout 25 used in the graphical representation 17 space.

Figure 2:
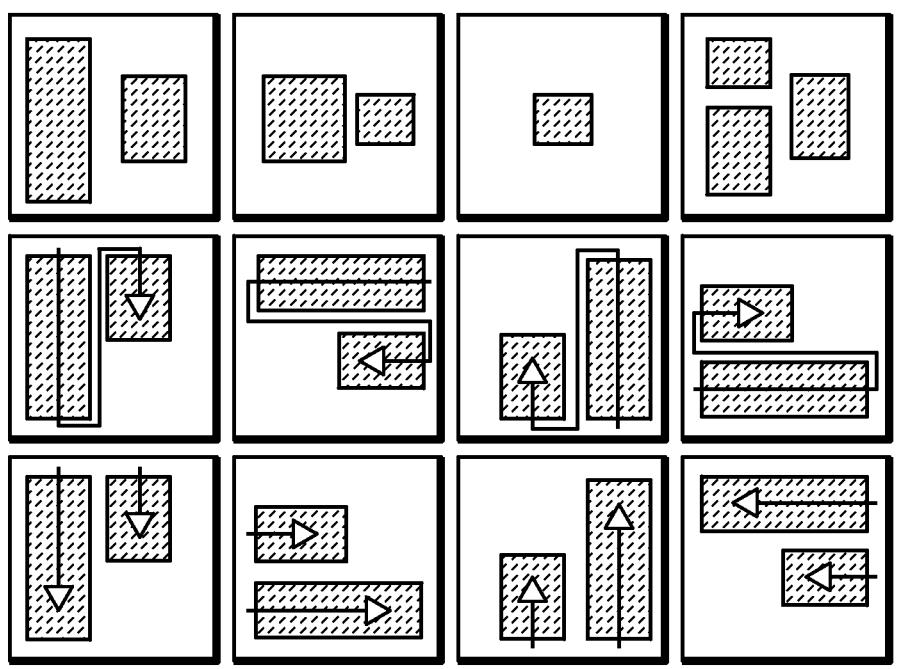
FIG. 2 is a schematic view of sample layouts employed in the embodiment of FIG. 1.

Sample layouts 25 that can be produced by the text layout engine 13 are as illustrated in FIG. 2. The arrows in the last two rows of sample layouts 25 represent the direction of text flow. Text layout engine 13 is not limited to these layouts 25. Other layouts are suitable.

A work of text can be segmented into smaller portions that may be anywhere from the entire body of the text work to a single character and various combinations of characters in between. By way of the text layout engine 13, after determining format and layout of the graphical representation 17, layout engine 13 segments the graphical representation 17 into smaller portions or 'tiles' 21. In a preferred embodiment, different sets of tiles 21 compose different zoom levels of the graphical representation 17. Thus layout engine 13 segments graphical representation 17 into a respective set of tiles 21 as a function of zoom level, different tile sets per different zoom levels. Common tiling techniques may be used.

Feature Extractor 31

Figure 3:
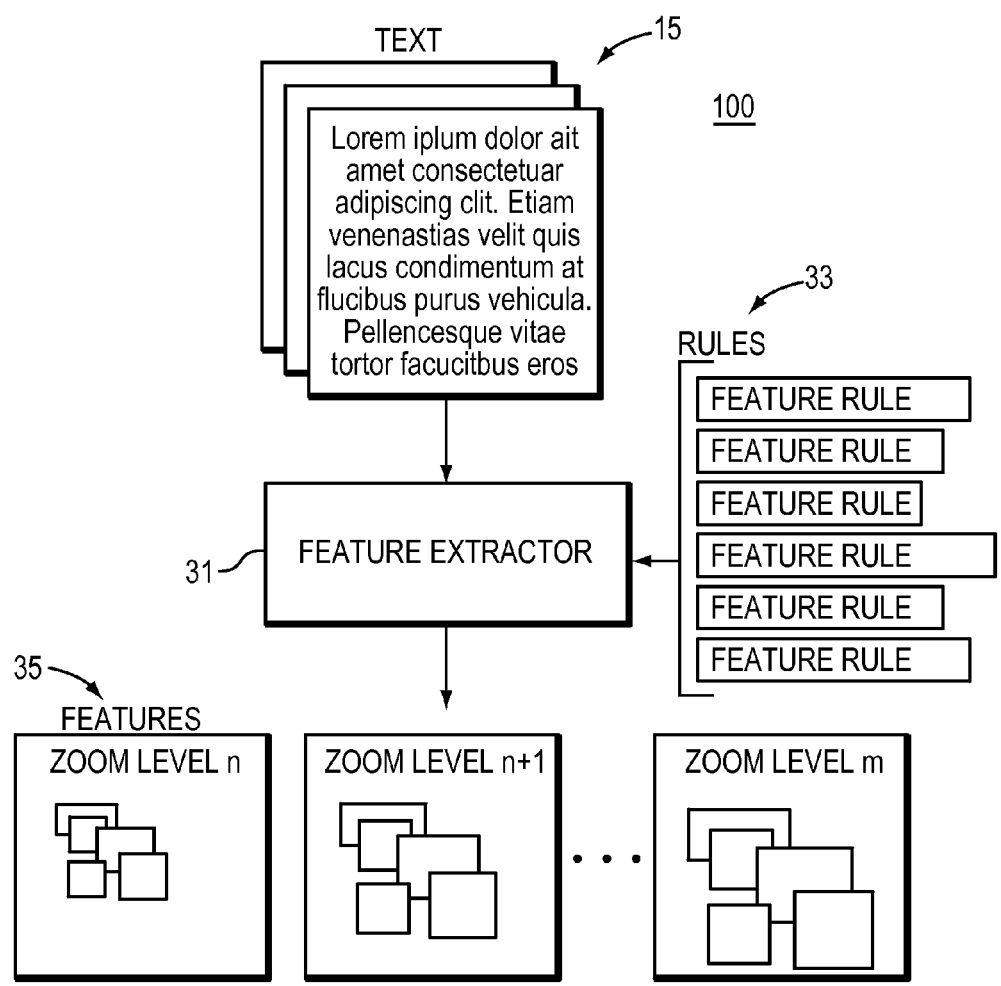
FIG. 3 is a block diagram of a feature extractor employed in the embodiment of FIG. 1.

In order to bring to light interesting portions of the given text, a feature extractor 31 (FIG. 3) takes in the body of text 15 as an input and using predefined or user customized rules 33, locates segments (portions) of the text that match the rules. This results in identified or otherwise determined features 35 (including predefined features 35 of the input text 15). Using the graphical indices built during the layout engine 13 portion of the system 100 (that map characters to their graphical location in graphical representation 17), feature extractor 31 saves features 35 together with graphical information sufficient to enable rendering by a mapping client.

Sample feature rules 33 include but are not limited to:

1. Dollar Amounts
2. Text Structure (e.g. section/chapter titles, headers, bulleted lists, quotes, capitalized words, acronyms, etc.)
3. Phone numbers
4. Parts of speech (e.g. nouns, verbs, adjectives etc.)
5. Words expressing a sentiment Map Interface Turning now to FIG. 4, map client 47 assembles the tiles 21 generated by the layout engine 13 into a single text document map 45 (i.e., image file of the input text 15). Map client 47 determines which set of tiles 21 to assemble based on zoom level, and determines tile contents (in part) based on stored features 35 and respective graphical information produced by feature extractor 31. The generated text map 45 can be panned, zoomed through, annotated, highlighted and interacted with by the user. Tiles 21, zoom level, features 35 and respective graphical information of FIGS. 1-3 enable the map client 47 to responsively generate the various views of text map 45. Other common techniques for supporting map interface, navigation operations and user interaction therewith are employed. Since the scale and size of a text map 45 often deem it too large to fit into a computer output screen, the space viewable by the user is deemed the viewport 41 through which any user interaction with the text map 45 takes place in one embodiment.

Features/Markers

Figure 5:
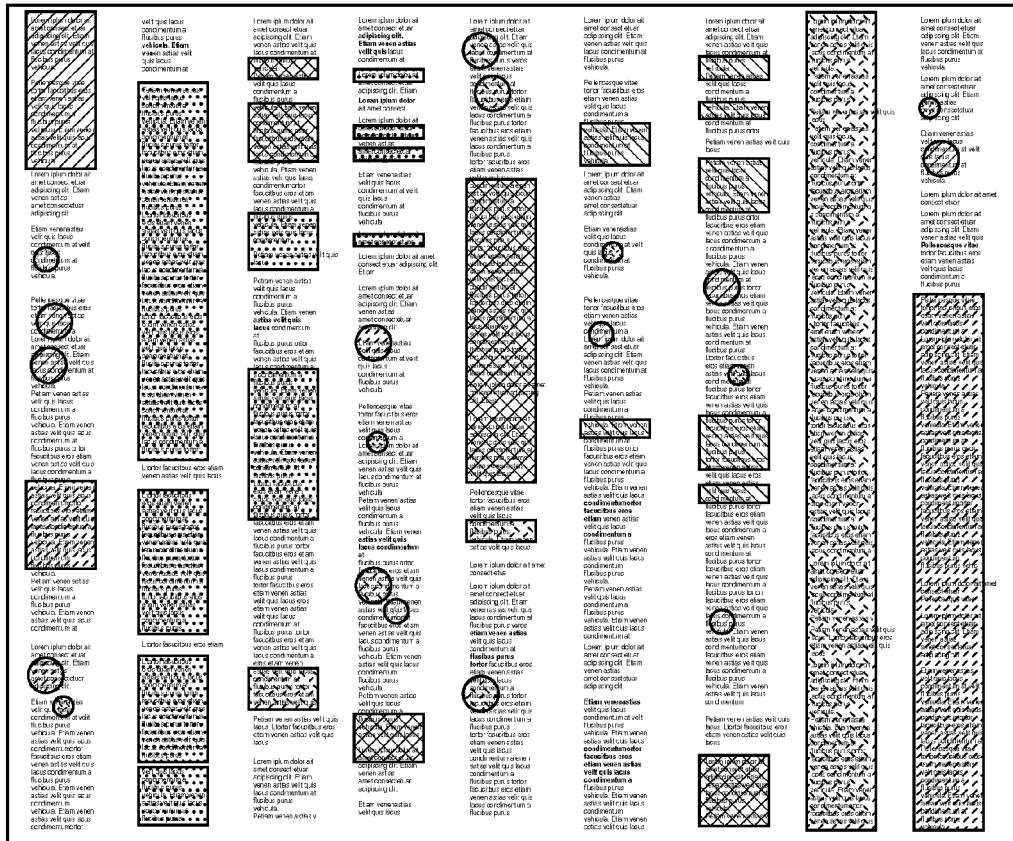
FIG. 5 is a schematic illustration of a text map area having overlaying graphical feature representations and/or markers.

The map client 47 utilizes a coordinate space that corresponds to a predefined extent which is computed during the initial layout 25 by layout engine 13. The coordinate space allows for exact placement (in accordance with appropriate place in the text) of graphical feature representations. FIG. 5 is illustrative of a text map area 45b as marked or overlayed by several types of features (representations thereof).

Sample graphical feature representations in a map client 47 include but are not limited to:

1. Markers identifying an area in the text (e.g. Circles, boxes, polygons, etc.)
2. Markers identifying a single point in the text (e.g. a pin, a dot, etc.)
3. Markers that are invisible (e.g. "hot spots" or hypertext or the like in the text linking to other websites or locations on the map, etc.)

All markers may or may not utilize styling such as color, opacity, outline etc. All markers may or may not respond to user interactions such as click, double click, mouse over, mouse in, mouse out, drag etc. The response may or may not include the alteration of the marker in any way. All markers may or may not alter their style, size, level of detail in accordance with the scale of the map. Common or known techniques are employed to implement aspects and characteristics of the markers and graphical feature representations.

Figure 6:
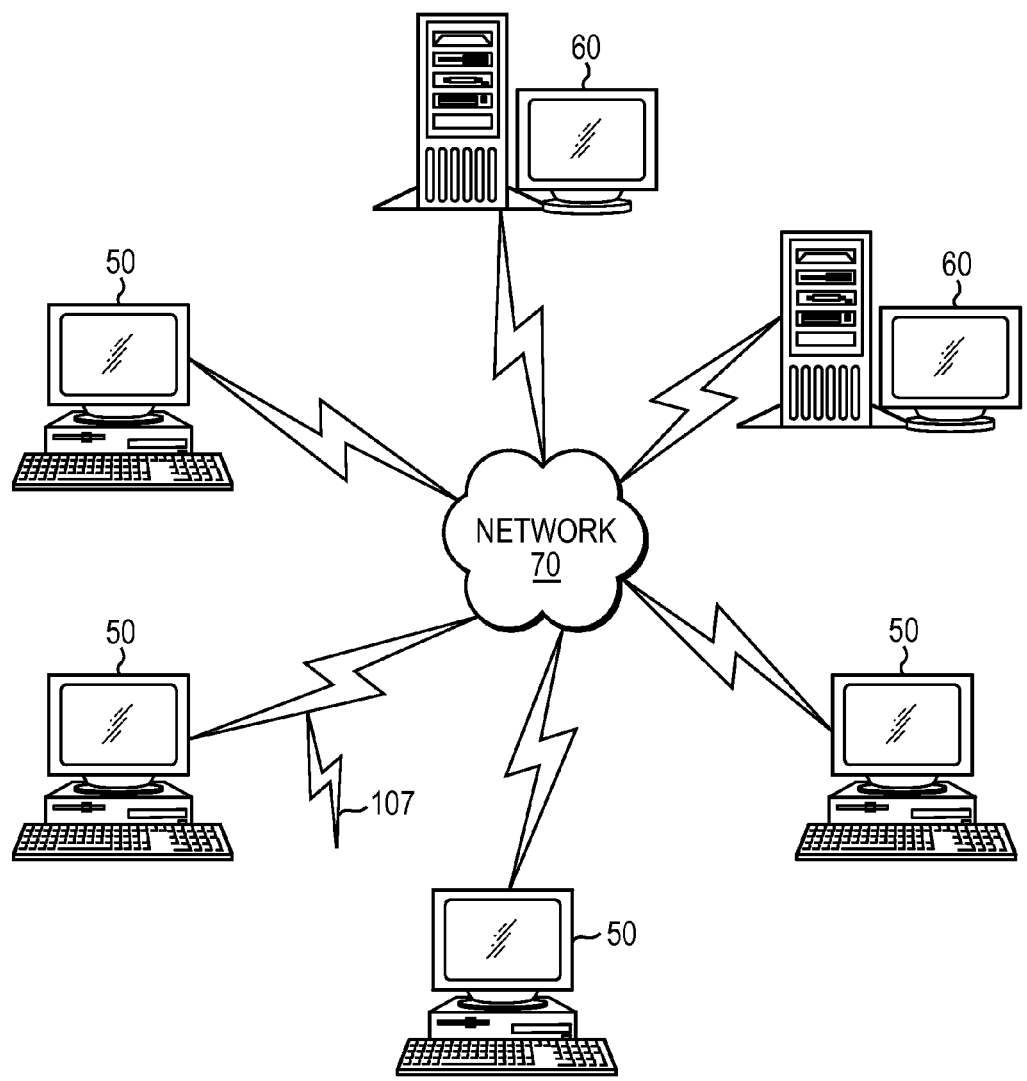
FIG. 6 is a schematic view of a computer network environment and which embodiments of the present invention may be deployed.

FIG. 6 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
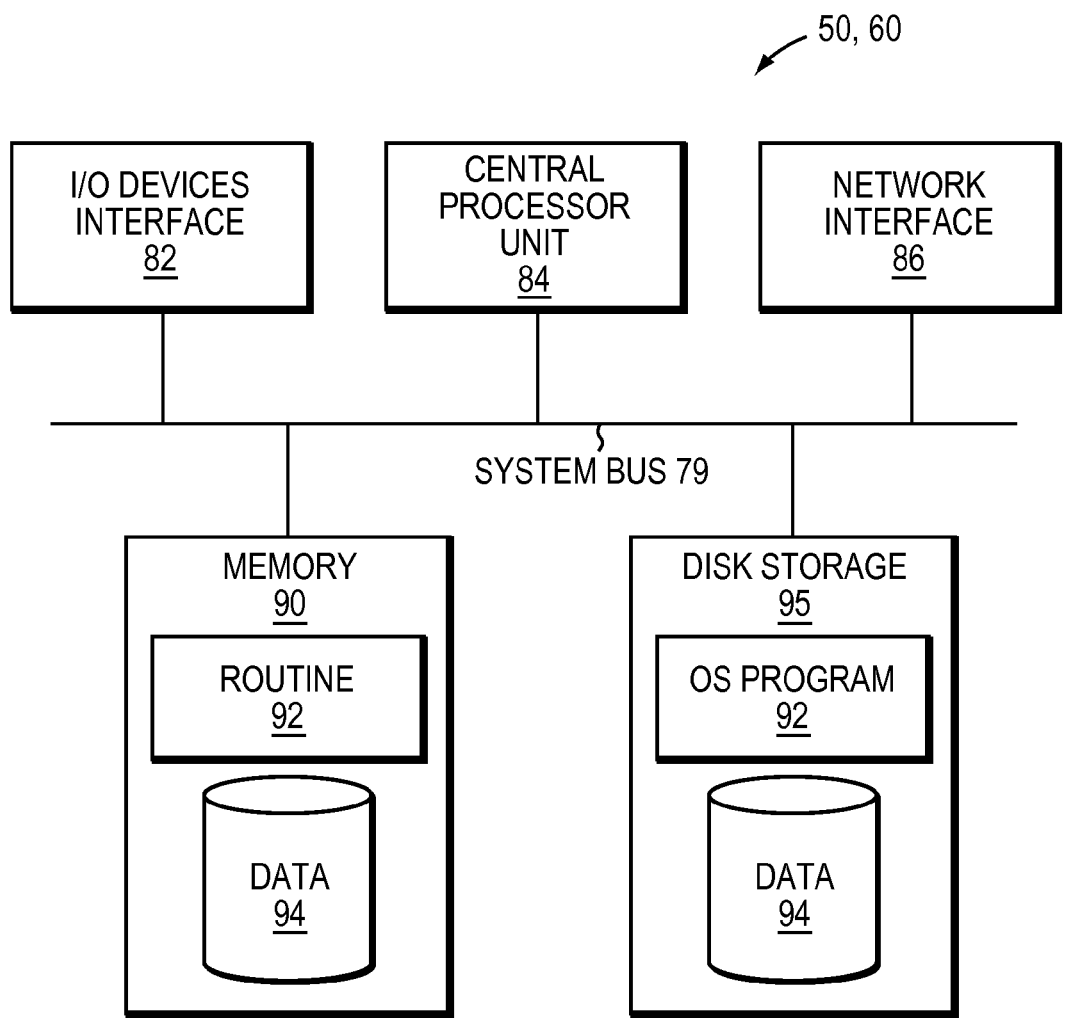
FIG. 7 is a block diagram of a computer node in the computer network of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment 100 of the present invention (e.g., layout engine 13, feature extractor 31, map client 47, map interface and supporting code detailed above and below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
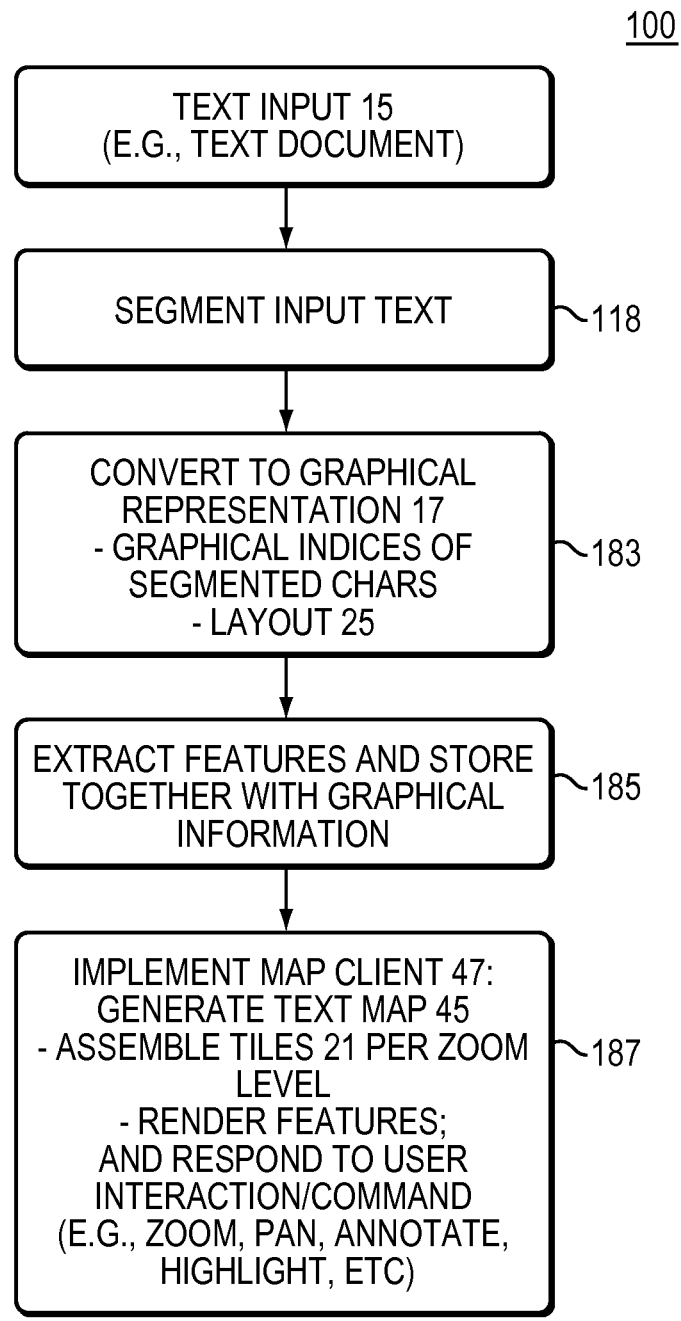
FIG. 8 is a flow diagram of one embodiment of the present invention.

Referring now to FIG. 8, a flow diagram of one embodiment (e.g., TextMaps system 100) is presented. System 100 receives input text 15 and processes the text content (textual data) employing layout engine 13, feature extractor 31 and map client 47 of FIGS. 1-5 as follows. The input text 15 may be a text document for example, or other body of text. Step 118 segments the input text 15 into smaller portions such as characters or character strings and the like. In one embodiment, layout engine 13 implements the segmentation Step 118. This segmenting prepares the textual data for the subsequent processing steps.

Next, at Step 183, layout engine 13 converts the input text to a graphical representation 17 stored in an image-type file. Step 183 properly formats and lays out the subject text to an image file to form graphical representation 17 as follows. Step 183 builds graphical indices that map (or otherwise associate) the segmented characters from step 118/source text 15 to their graphical coordinate space location in graphical representation 17. And Layout engine 13/Step 183 generates a layout 25 (such as one of the sample layouts 25 of FIG. 2) for the graphical representation 17. Further one embodiment uses tiling (tiles 21) to form a respective version of graphical representation 17 per one zoom level. Different zoom levels use different sets of tiles 21 to form graphical representation 17.

Continuing with FIG. 8, Step 185 (e.g., feature extractor 31) extracts features from the input text 15 and stores the extracted features 35 (FIG. 3) together with graphical information. Step 185 utilizes the graphical indices of Step 183 to accomplish this. In one embodiment, Step 185/feature extractor 31 implements rules-based extraction and extracts predefined or predefinable features of input text 15. Other feature extraction techniques are suitable.

Step 187 implements the map client 47 and supports the user interface responsive to user interaction with system 100. Step 187/map client 47 assembles tiles 21 as a function of zoom level (user selected or default) and generates a text map 45. Step 187 uses the stored respective graphical information and features 35 from Step 185 to render representations of these features on text map 45. Common techniques are used to support the zoom, pan, annotate, highlight, etc. operations, other navigation and non-navigation operations, and the interactive interface with the user.

Similarly, step 187 employs suitable techniques to implement markers (circles, pin dots, hotspot/hyperlinks, etc. such as described above in FIG. 5) on text map 45. In one embodiment, step 187 uses different respective layers (overlayed on top of one another and map view 41, 45) to render graphical feature representations and markers on text map 45.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of navigating textual data comprising:
   given a body of text in a computer, converting the body of text to a graphical representation, said converting being by a computer processor; and
   rendering through the computer the graphical representation in a user-interactive interface, the rendered graphical representation employing geographical mapping operations and techniques so as to serve as a text map and the user-interactive interface having navigation operations that enable at least panning of the text map and zooming of the text map, wherein panning includes re-centering of the text map in relation to a viewport that is represented by a user's browser window.

2. A computer method as claimed in claim 1 wherein the body of text is any of a document, book, article and other work of text.

3. A computer method as claimed in claim 1 wherein the converting includes mapping characters from the given body of text to respective graphical locations in the graphical representation.

4. A computer method as claimed in claim 1 wherein the converting includes determining a layout of text in the graphical representation.

5. A computer method as claimed in claim 1 further comprising segmenting the graphical representation into one or more sets of tiles.

6. A computer method as claimed in claim 5 wherein there is a respective different set of tiles for different zoom levels.

7. A computer method as claimed in claim 1 further comprising:
   identifying features in the given body of text; and
   storing the identified features in a manner enabling rendering representation of the identified features with the graphical representation.

8. A computer method as claimed in claim 7 wherein the identified features are predefined features in the body of text.

9. A computer method as claimed in claim 1 further comprising overlaying on the text map, graphical feature representations and markers.

10. A computer method as claimed in claim 9 wherein the markers include any combination of:
   a geometric shape identifying an area in the text map,
   an indicator identifying a single point in the text map, and
   hyperlinks or similar links.

11. The computer method of claim 4, wherein layout of text in the graphical representation includes direction of text flow.

12. The computer method of claim 8 wherein the identified features at least include dollar amounts, phone numbers, words expressing a sentiment, parts of speech including at least nouns, verbs, and adjectives, text structure including at least section titles, chapter titles, headers, bulleted lists, quotes, capitalized words, and acronyms.

13. A computer-implemented text navigation apparatus, comprising:
   a computer having a body of text stored in a memory therein,
   a layout engine executable by the computer and configured to convert the body of text to a graphical representation; and
   a computer-implemented map client coupled to receive the graphical representation and rendering through the computer the graphical representation in a user-interactive interface, the rendered graphical representation employing geographical mapping operations and techniques so as to serve as a text map and the user-interactive interface having navigation operations that enable at least panning of the text map and zooming of the text map, wherein panning includes re-centering of the text map in relation to a viewport that is represented by a user's browser window.

14. A computer apparatus as claimed in claim 13 wherein the body of text is any of a document, book, article and other work of text.

15. A computer apparatus as claimed in claim 13 wherein the layout engine is configured to map characters from the given body of text to respective graphical locations in the graphical representation.

16. A computer apparatus as claimed in claim 13 wherein the layout engine is configured to determine a layout of text in the graphical representation.

17. A computer apparatus as claimed in claim 13 wherein the layout engine further segments the graphical representation into one or more sets of tiles.

18. A computer apparatus as claimed in claim 17 wherein there is a respective different set of tiles for different zoom levels.

19. A computer apparatus as claimed in claim 13 further comprising a feature extractor executable by the computer and configured to:
   identify features in the given body of text; and
   store the identified features in a manner enabling rendering representation of the identified features with the graphical representation.

20. A computer apparatus as claimed in claim 19 wherein the identified features are predefined features in the body of text.

21. A computer apparatus as claimed in claim 13 wherein the map client further overlays on the text map graphical feature representations and markers, and wherein the markers include any of:
   a geometric shape identifying an area in the text map,
   an indicator identifying a single point in the text map, and
   hyperlinks or similar links.

22. A computer program product for navigating textual data comprising:
   a non-transitory computer readable storage medium having computer readable code embodied therewith, the computer readable code when executed by a computer causing:
   conversion of a given body of text in the computer to a graphical representation; and
   rendering to a screen display the graphical representation in a user-interactive interface, the rendered graphical representation employing geographical mapping operations and techniques so as to serve as a text map and the user-interactive interface having navigation operations that enable at least panning of the text map and zooming of the text map, wherein panning includes re-centering of the text map in relation to a viewport that is represented by a user's browser window.

* * * * *